US012515838B2

(12) United States Patent
 Eleew

(10) Patent No.: US 12,515,838 B2
(45) Date of Patent: Jan. 6, 2026

(54) RETORT SYSTEM AND PROCESS

(71) Applicant: STOCK America LLC, Garner, NC (US)

(72) Inventor: Richard D. Eleew, Madisonville, LA (US)

(73) Assignee: STOCK AMERICA LLC, Garner, NC (US)

( * ) Notice: Subject to any disclaimer, the term of this patent is extended or adjusted under 35 U.S.C. 154(b) by 1071 days.

(21) Appl. No.: 17/479,431

(22) Filed: Sep. 20, 2021

(65) Prior Publication Data

US 2022/0106068 A1  Apr. 7, 2022

Related U.S. Application Data

(60) Provisional application No. 63/086,224, filed on Oct. 1, 2020.

(51) Int. Cl.
 B65B 55/02 (2006.01)
 A23B 2/33 (2025.01)
 A61L 2/18 (2006.01)

(52) U.S. Cl.
 CPC ............. *B65B 55/027* (2013.01); *A23B 2/33* (2025.01); *A61L 2/18* (2013.01); *A23V 2002/00* (2013.01)

(58) Field of Classification Search
 CPC ......... A23L 3/12; B65B 55/02; B65B 55/027; A61L 2/18
 See application file for complete search history.

(56) References Cited

U.S. PATENT DOCUMENTS

| 861,120 A | 7/1907 | Hornbeck |
| 915,428 A | 3/1909 | Guibbini |
| 1,010,805 A | 12/1911 | Rogers |
| 1,491,031 A | 4/1924 | Chapman |
| 1,636,768 A | 7/1927 | Ford |
| 1,709,175 A | 4/1929 | Huygen |
| 1,975,073 A | 10/1934 | Chapman |
| 2,052,096 A | 8/1936 | Kronquest |
| 2,086,241 A | 7/1937 | Schaerr |
| 2,134,817 A | 11/1938 | Gerber |

(Continued)

OTHER PUBLICATIONS

U.S. Commissioner for Patents, International Search Report and Written Opinion, issued Jul. 16, 2024, which pertains to PCT Patent Application No. PCT/US2024/016628. 14 pgs.

*Primary Examiner* — Donald R Spamer
*Assistant Examiner* — Kayla Rose Sarantakos
(74) *Attorney, Agent, or Firm* — THOMPSON HINE LLP

(57) ABSTRACT

A retort system includes a vessel and a plurality of product holding structures for holding one or more products to be treated, the product holding structures configured to be received within the interior volume of the vessel. A heat exchange system, includes a liquid circulation path having a discharge side, a suction side and a pump operable to move a heat exchange liquid from the suction side to the discharge side. The suction side is fluidly connectable to a lower region of the interior volume. The discharge side is fluidly connectable to deliver heat exchange liquid into the product holding structures via pump operation causing the product holding structures to fill with heat exchange liquid to a product submersion level while a level of heat exchange liquid outside the product holding structures and within the interior volume remains below the product submersion level.

10 Claims, 10 Drawing Sheets

(56) References Cited

U.S. PATENT DOCUMENTS

| | | | |
|---|---|---|---|
| 2,282,187 A | 5/1942 | Herold | |
| 2,499,203 A | 2/1950 | Warren | |
| 3,291,289 A | 12/1966 | Savage | |
| 3,370,727 A | 2/1968 | Shaw | |
| 3,505,946 A | 4/1970 | Bayne et al. | |
| 3,511,169 A | 5/1970 | Fritzberg | |
| 3,589,611 A | 6/1971 | Jones, Jr. | |
| 3,696,912 A | 10/1972 | Fleischauer | |
| 3,785,468 A | 1/1974 | Misenheimer | |
| 4,003,302 A | 1/1977 | Mencacci | |
| 4,060,914 A | 12/1977 | Hoffman | |
| 4,148,933 A * | 4/1979 | Janovtchik | B65B 55/14 426/511 |
| 4,170,421 A | 10/1979 | Balding | |
| 4,179,986 A * | 12/1979 | Mencacci | A61L 2/04 126/369 |
| 4,221,638 A | 9/1980 | Jones, Jr. | |
| 4,348,912 A | 9/1982 | Thomas | |
| 4,371,335 A | 2/1983 | Jones | |
| 4,401,051 A | 8/1983 | Gunther | |
| 4,632,026 A | 12/1986 | Yamamoto | |
| 4,669,667 A | 6/1987 | Perkins | |
| 4,708,053 A | 11/1987 | Forsythe | |
| 4,738,617 A | 4/1988 | Zimmerman | |
| 4,748,816 A | 6/1988 | Arfert | |
| 4,929,087 A | 5/1990 | Brigolle | |
| 5,056,642 A | 10/1991 | Highsmith | |
| 5,561,027 A | 10/1996 | Verlinden | |
| 5,564,482 A | 10/1996 | Grat | |
| 5,626,824 A | 5/1997 | Ishikawa | |
| 5,685,326 A | 11/1997 | Cord | |
| 5,687,639 A | 11/1997 | Planck | |
| 5,836,204 A | 11/1998 | Skak | |
| 5,857,312 A | 1/1999 | Walden | |
| 6,177,048 B1 | 1/2001 | Lagerstedt | |
| 6,605,252 B2 | 8/2003 | Omasa | |
| 6,626,087 B2 | 9/2003 | Roumagnac | |
| 6,739,108 B2 | 5/2004 | Blattner | |
| 6,745,664 B2 | 6/2004 | Kopkie | |
| 7,104,465 B2 | 9/2006 | Persoons | |
| 7,188,993 B1 | 3/2007 | Howie | |
| 7,380,978 B2 | 6/2008 | Damhuis | |
| 7,481,972 B2 | 1/2009 | Christensen | |
| 7,712,202 B2 | 5/2010 | Greve | |
| 8,262,987 B2 | 9/2012 | Tago | |
| 8,277,754 B2 | 10/2012 | Roumagnac | |
| 9,205,158 B1 * | 12/2015 | Jacob | A23B 2/30 |
| 2003/0081499 A1 | 5/2003 | Friedman | |
| 2005/0013908 A1 | 1/2005 | Persoons | |
| 2005/0198923 A1 | 9/2005 | Wolters | |
| 2005/0249650 A1 | 11/2005 | Johannes Damhuis et al. | |
| 2007/0258850 A1 | 11/2007 | Miller, III | |
| 2007/0292570 A1 | 12/2007 | Walden | |
| 2011/0111149 A1 | 5/2011 | Wolters | |
| 2013/0071546 A1 * | 3/2013 | Tomoda | A23B 4/0056 392/394 |
| 2022/0106068 A1 | 4/2022 | Eleew | |

\* cited by examiner

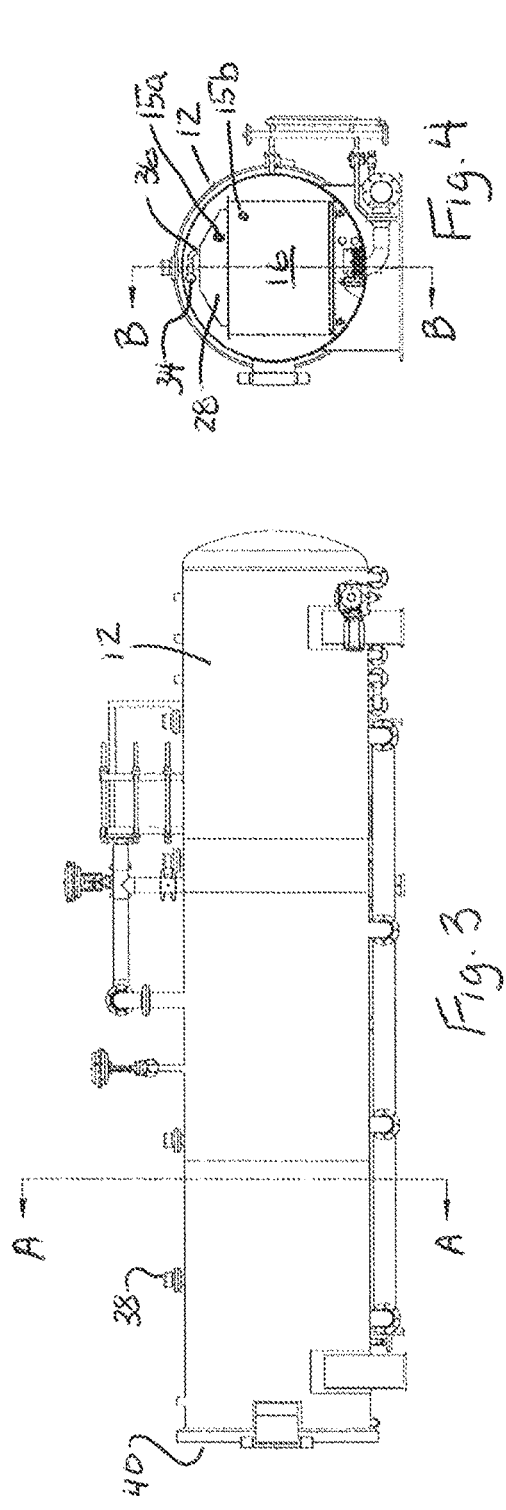
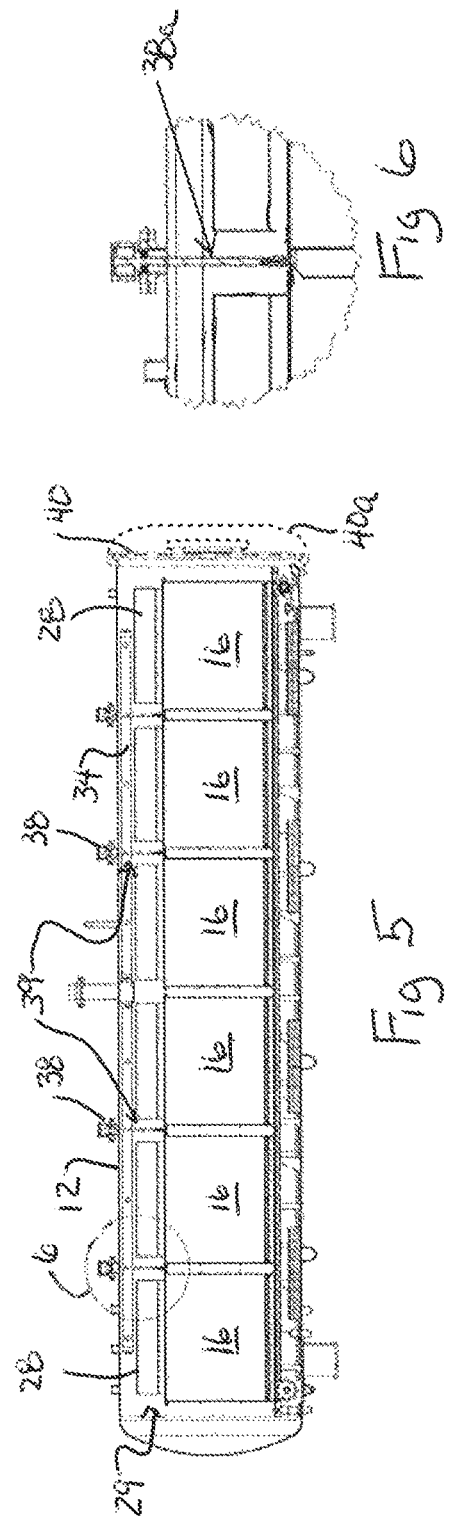

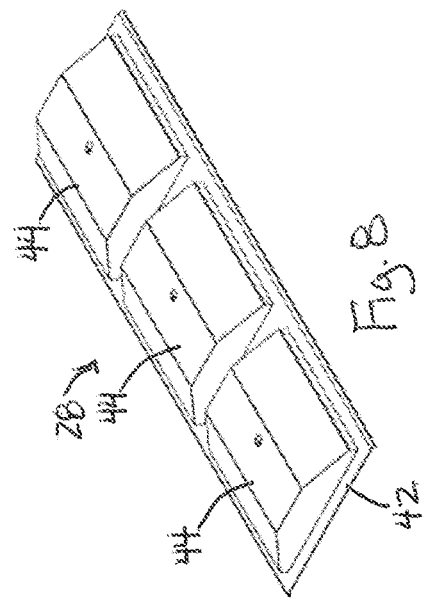
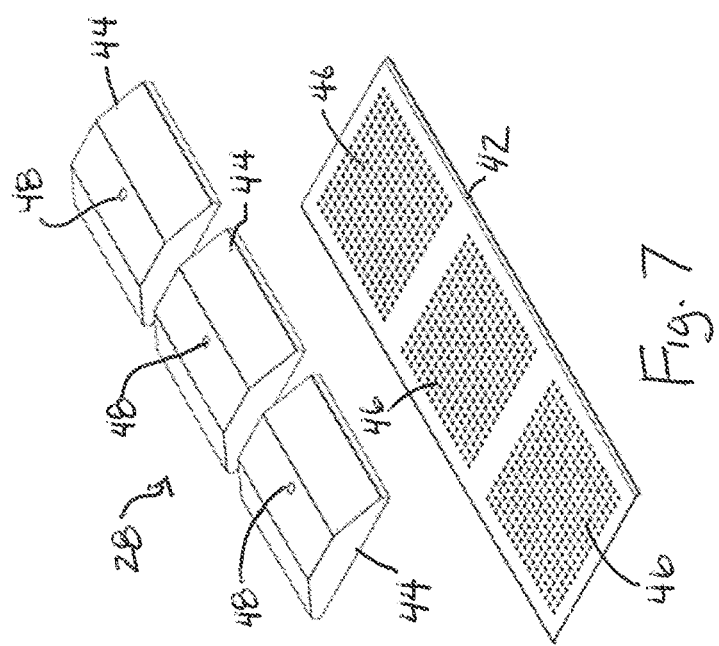

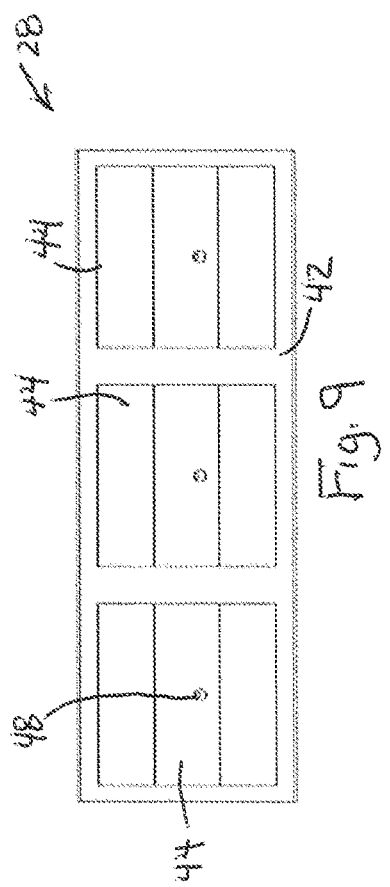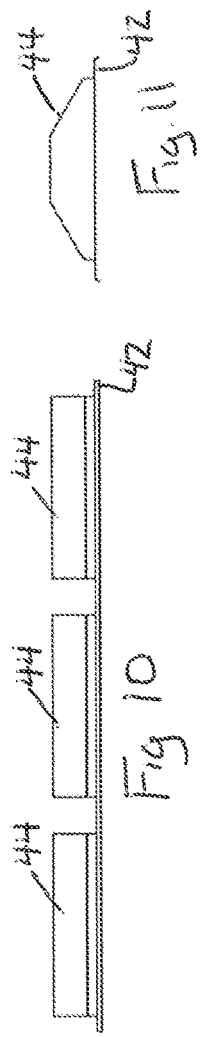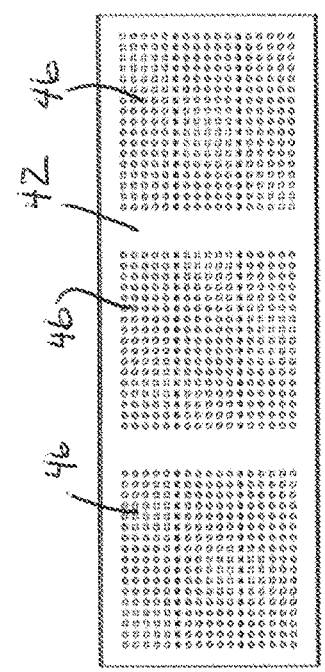

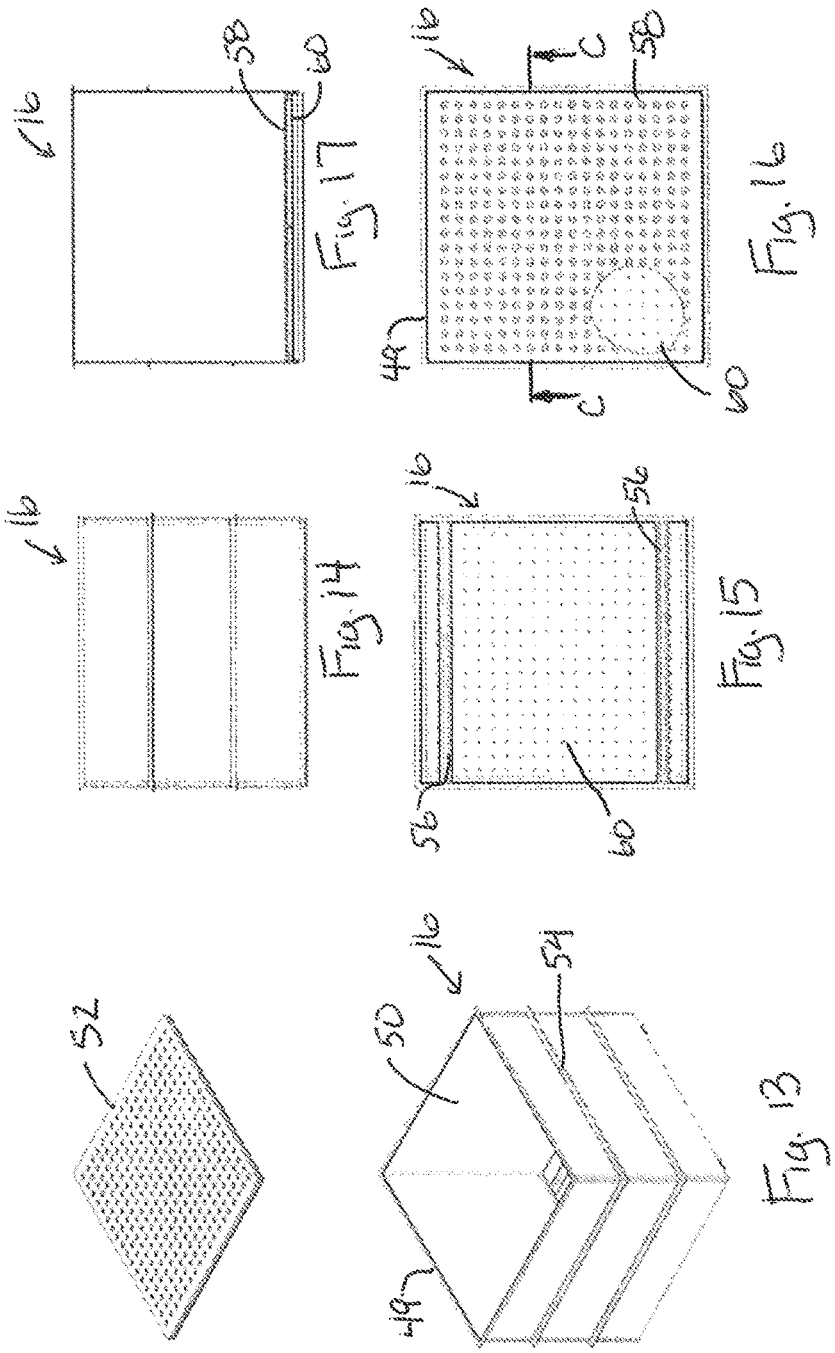

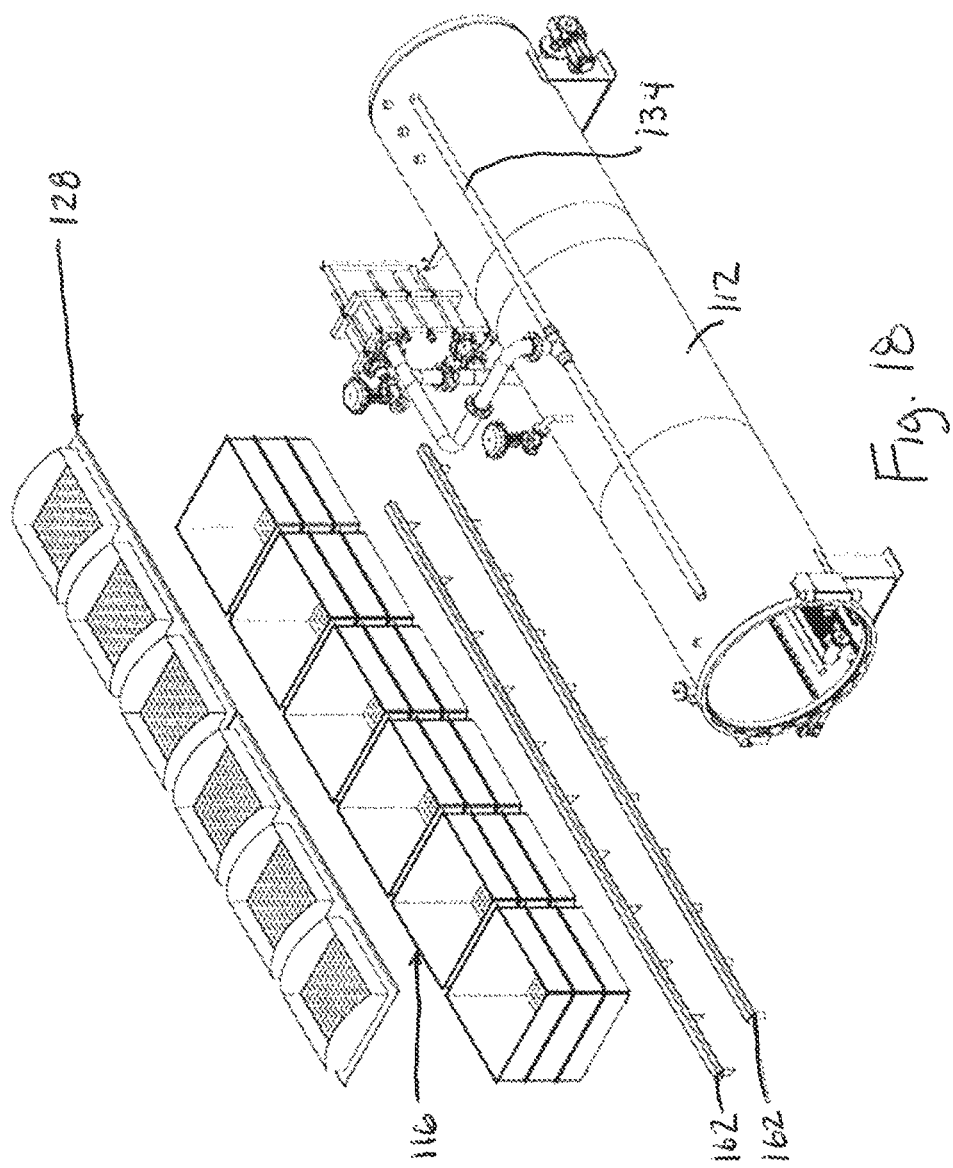

RETORT SYSTEM AND PROCESS

TECHNICAL FIELD

The present application relates to commercial sterilization autoclaves (known in the industry as retorts), and in particular to systems and methods to commercially sterilize and render shelf-stable (or otherwise heat treat) previously packaged products through heat transfer from a process liquid in a controlled manner.

BACKGROUND

To commercially sterilize many In-Container foods, pharmaceuticals, nutraceuticals and other products, to make them "shelf-stable," the products are subjected to a commercial sterilization method that includes heating the product in its sealed container to a predetermined temperature and maintaining the temperature for a product specific duration. Pressure may also be supplied to preserve the integrity of the product packaging. This process is commonly referred to as an autoclave process, retort process or a commercial sterilization process.

A retort is a pressure vessel commonly used in the food industry for pasteurization and commercially sterilizing food in the container. A variety of acceptable commercial retort processes are known in the food industry, including for example, standard water immersion, cascade (also known sometimes as trickle or shower), and water spray retorting.

In a water spray process, heated water is circulated via a pump circulation loop that draws the water from a sump or reservoir in the bottom of the retort and pumps the water through a distribution header fitted with spray nozzles at the top and or sides of the retort. The distribution pipes typically run along the length of the vessel. Compressed air is used to develop overpressure in the retort throughout the process to offset the pressure differential inside the product container. There are typically 5-7 distribution headers with multiple spray nozzles positioned around the product load to distribute water throughout the load. Each nozzle has a given flow and spray angle required to assist with a desired homogeneous heat transfer.

Water cascade retorting is another acceptable process for pasteurizing and commercially sterilizing containers that require overpressure to ensure the integrity of the container. In a water cascade process, water is circulated via a pump circulation loop that draws the water from a sump or reservoir in the bottom of the retort and pumps the water through a distribution header located at the top and or sides of the retort. The header includes openings that allow water to flow down into a metal pan that runs the length of the retort above the product. The metal pan typically fills with water to a depth of about 12 mm to 20 mm, and has openings that allow the water to trickle or cascade from the pan (under the head pressure of the water depth in the pan), down to and through the product load. The openings are typically sized and spaced such that only between about 3% and about 6% of the pan surface is open. A typical diameter of the openings may be on the order of about 6 mm to 9 mm, with a density distribution to result in a center to center spacing between the openings of about 40 mm. The water is heated in the sump by direct steam or through a heat exchanger in the circulation loop.

Among the known retorting processes, standard water immersion provides effective heat distribution throughout the retort and penetration into the product to be commercially sterilized, but such full vessel systems require a large amount of heat transfer fluid and energy. In this application, the entire retort vessel chamber (also commonly referred to as the drum) is filled with heated water under pressure to completely immerse the product. Typically, the entire load of product containers is also rotated within the retort vessel chamber to stir the water and provide even heat distribution to the product. Because the outside shell of the retort vessel acts as a heatsink, and because the entire volume of liquid filling the interior of the vessel must be heated, this process requires a substantial amount of energy.

Accordingly, what is needed is a new system and method for commercially sterilizing packaged products that uses precise fluid control and reduces the volume of processing fluid that is required so as to reduce the amount of energy needed for heating and cooling.

SUMMARY

The above goal can be achieved by use of a closed loop system in which packaged food product holding structures within the retort interior volume create closed column liquid paths in which the heated processing liquid can be pressurized to completely immerse the food product within the baskets without also filling the entire vessel volume.

A new system and method is disclosed herein based on the principle of controlling liquid flow to immerse packaged products in one or more closed columns within the interior of a retort vessel. The closed column may be formed in part by a packaged product holding structure, such as a basket or stacked tray assembly, that has an open top and one or more flow control orifices located in or near the bottom of the structure. According to some embodiments, the packaged product holding structure has a completely solid side wall. A fluid distribution plenum may engage the top rim of the structure to create a seal around the top opening of the structure, thus closing the column and allowing the structure to fill with liquid under positive pressure. Specifically, as liquid is injected into the top of the product holding structure, exit flow is restricted through the flow control orifices at the bottom causing the structure to fill with heat transfer liquid that completely immerses the products in the structure.

According to one aspect, flow is regulated though closed pathways by pump speed and the orifices in the bottom of the product holding structures. Specifically, the orifices at the bottom of a product holding structure are designed to provide restricted flow that forces the structure to fill completely and remain full during the retorting process, yet drain when the process is complete. A pump creates pressure within the circuit and flushes water through any and all available open areas around product containers within the product holding structure. The process liquid flows from the distribution plenum through one or more product holding structures, exits the one or more product holding structures through the orifices in the bottom, is collected in a common reservoir, and then is recirculated to continue the process.

Accordingly, the new system and process selectively pipes process liquid through a static product load under hydraulic pressure in a closed column, thus precisely controlling the rate of heat transfer while using less process liquid and energy than known retorting processes. In particular, using the product holding structure as a process chamber rather than the entire interior of the retort vessel reduces the volume of process liquid that is required, which in turn reduces the amount of energy required to heat or cool the process liquid. Additionally, using the product holding structure as a process chamber rather than the entire interior of the retort vessel reduces the area of heatsink, thus improving heat transfer from the process liquid to the product and shortening the "come up time" during which the product is raised to a required commercial sterilization temperature.

The advantageous of the new system can also be implemented using product holding structures other than traditional retort baskets.

In another aspect, a retort system includes a vessel defining an interior volume, the vessel including at least one door movable between open and closed positions, and a plurality of product holding structures for holding one or more products to be treated, the product holding structures configured to be received within the interior volume of the vessel. A heat exchange system, includes a liquid circulation path having a discharge side, a suction side and a pump operable to move a heat exchange liquid from the suction side to the discharge side. The discharge side is fluidly connectable to deliver heat exchange liquid into the product holding structures. The suction side is fluidly connectable to a lower region of the interior volume. The pump is operable such that the heat exchange liquid moves into the product holding structures causing the product holding structures to fill with heat exchange liquid to a product submersion level while a level of heat exchange liquid outside the product holding structures and within the interior volume remains below the product submersion level.

In a further aspect, a retort system includes a retort vessel defining an interior volume, and a product holding structure configured to e received within the interior volume. The product holding structure includes one or more inlet openings that together define a first flow area for receiving heat exchange liquid and one or more outlet openings that together define a second flow area for outflow of heat exchange liquid, the second flow area being smaller than the first flow area for limiting flow of heat exchange liquid out of the product holding structure. A heat exchange liquid flow system is configured to direct heat exchange liquid into the product holding structure causing the product holding structure to fill with heat exchange liquid to at least a submersion level above products within the product holding structure while a level of heat exchange liquid outside the product holding structure and within the interior volume remains below the submersion level.

In still another aspect, a retort system includes a plurality of product holding structures for holding packaged products to be treated, each product holding structure having at least one liquid inlet and one or more liquid outlets, and a retort vessel sized to receive the plurality of product holding structures within the vessel. A process liquid circulation path includes a suction side proximate a lower region of the retort vessel, a discharge side, and a circulation pump located between the suction side and the discharge side, the pump being operable to transport process liquid from the suction side to the discharge side. A distribution feed system fluidly connected or connectable to the discharge side of the circulation path and configured to distribute process liquid into the plurality of product holding structures via the liquid inlets. An actuation system configured to press together the distribution feed system and the plurality of product holding structures.

In another aspect, a method for heat treating packaged products involves the steps of: using a retort vessel having an interior vessel volume, a heat exchange liquid circulation path having a pump, and a distribution feed system in fluid connection with a discharge side of the circulation path; using a plurality of product holding structures for holding packaged products, each of the product holding structures having one or more inlet openings, at least one flow control orifice, and an interior volume; loading packaged products to be treated into the plurality of product holding structures; inserting the plurality of product holding structures loaded with packaged products into the vessel; and circulating heat exchange liquid through each product holding structure to treat the packaged products, including: pumping heat exchange liquid through the circulation path to the distribution feed system; distributing heat exchange liquid through the distribution feed system into the each product holding structure; limiting flow out of each product holding structure using the at least one flow control orifice to cause each product holding structure to fill to a level that completely immerses the packaged products within heat exchange liquid; and collecting in a suction side of the circulation path heat exchange liquid that exits the product holding structures through the flow control orifices.

In another aspect, a method for heat treating packaged products involves: using a retort vessel defining a vessel volume; using a plurality of packaged product holding structures that together define a treatment volume less than the vessel volume; inserting packaged products into the plurality of packaged product holding structures; inserting the plurality of packaged product holding structures into the retort vessel; and circulating a heated processing liquid under pressure through the treatment volume to treat the packaged products via an immersion flow of the heated processing liquid without filling the vessel volume with heated processing liquid.

BRIEF DESCRIPTION OF THE DRAWINGS

FIG. 3 is a side view of the retort of FIG. 2;

FIG. 4 is a cross-section view taken along line A-A of FIG. 3;

FIG. 5 is a cross-section view taken along line B-B of FIG. 4;

FIG. 6 is an enlarged side view of Detail C in FIG. 5;

FIG. 7 is an exploded perspective view of a fluid distribution plenum according to one embodiment;

FIG. 8 is a perspective view of the fluid distribution plenum of FIG. 7;

FIG. 9 is a top view of the fluid distribution plenum of FIG. 8;

FIG. 10 is a side view of the fluid distribution plenum of FIGS. 8-9;

FIG. 11 is an end view of the fluid distribution plenum of FIGS. 8-10;

FIG. 12 is a bottom view of the fluid distribution plenum of FIGS. 8-11;

FIG. 13 a disassembled perspective view of a food product basket according to one embodiment;

FIG. 14 is a side view of the food product basket of FIG. 13;

FIG. 15 is a bottom view of the food product basket of FIG. 14

FIG. 16 is a top view the food product basket of FIG. 15 with a portion of a top base plate removed to reveal a portion of a lower base plate below;

FIG. 17 is a cross-section of the food product basket of FIG. 14 taken long line C-C of FIG. 16;

FIG. 18 is an exploded perspective view of a second embodiment of the new retort;

DETAILED DESCRIPTION

Figure 1:
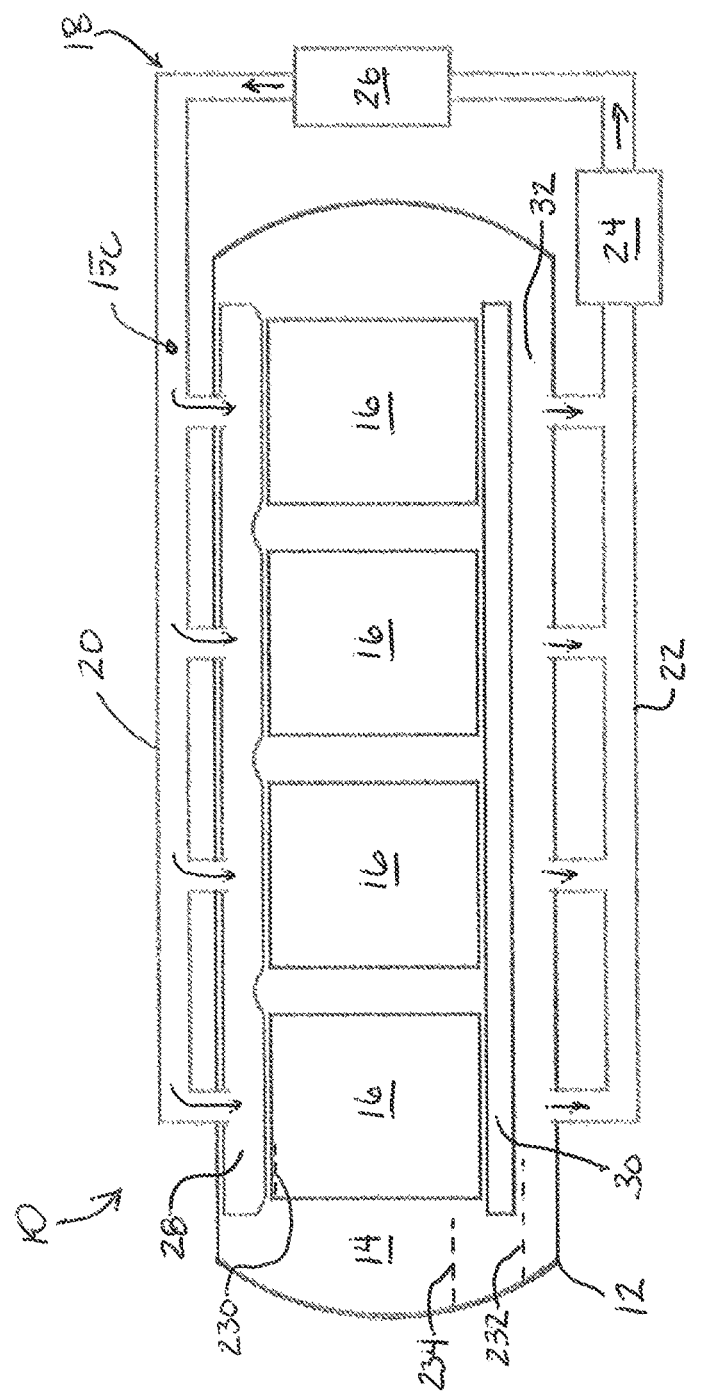
FIG. 1 is a side schematic representation of a new retort system according to one embodiment.

With reference to FIG. 1, the new retort system 10 for performing a new packaged product commercial sterilization method generally comprises a main vessel body 12 that defines an interior volume 14, at least one removable product basket 16 that is received in the interior volume of the vessel, and a circulation loop 18 for circulating a heat exchange liquid (aka heat transfer liquid, process liquid or processing liquid), which typically will be water, through the retort system and, specifically, past the products (not shown) in the baskets 16 during the commercial sterilization process. The retort vessel body 12 typically includes a door (not shown in FIG. 1) that permits the baskets 16 containing packaged products such as canned or vacuum sealed food items to be loaded into or removed from the interior volume 14. Although FIG. 1 schematically depicts four baskets, the invention contemplates any number of baskets being received in the interior volume of the retort system. The circulation loop includes a discharge side 20, a suction side 22, and a pump 24 that transports heat transfer liquid from the suction side to the discharge side. A heat exchanger 26, which may be driven by any of a wide variety of known heating or cooling elements, is operable to heat and/or cool the heat exchange liquid depending on the requirements of the commercial sterilization process.

With continued reference to FIG. 1, the discharge side 20 of the circulation loop 18 supplies heat exchange liquid to a discharge feed system or distribution feed system 29, which here includes one or more distribution plenums 28, which will be described in more detail below. The distribution plenum 28, which is typically located in the interior volume of the main retort vessel body 12, is designed to evenly distribute heat transfer liquid, under pressure, to the baskets 16. According to one embodiment, which will be describe in more detail with reference to FIG. 2-6, the distribution plenum can be actuated up and down to come into contact with and form a seal around the tops of the baskets 16. According to a second embodiment, which will be described in more detail with reference to FIGS. 18-22, the distribution plenum 28 remains stationary and an optional basket lift mechanism 30 can be actuated to lift the baskets 16 into contact with the distribution plenum 28. Of course, other embodiments are possible.

The baskets 16 may be specially designed to form closed fluid passageways or columns within the interior volume of the retort vessel where packaged products can be subjected to controlled temperature and pressure regimes. In preferred embodiments, each basket 16 has an open top to receive liquid from the distribution plenum 28, substantially solid side walls, and one or more flow control orifices in, and/or near, the bottom of the basket. The dimensions of the flow control orifices and the flow rate of the pump 24 can be selected to cooperatively cause the baskets 16 to fill with heat exchange liquid and remain under pressure during the retorting process, yet drain when the process is completed. Specifically, by restricting outflow using flow control orifices in or near the bottom of the baskets, inflow supplied by the pump will rapidly fill the baskets and, provided that the plenum seals against the tops of the baskets, maintain the contents under pressure. Heat exchange liquid that drains from the baskets 16 collects in a reservoir or sump 32 in the bottom of the retort vessel, which feeds the suction side 22 of the circulation loop.

Figure 2:
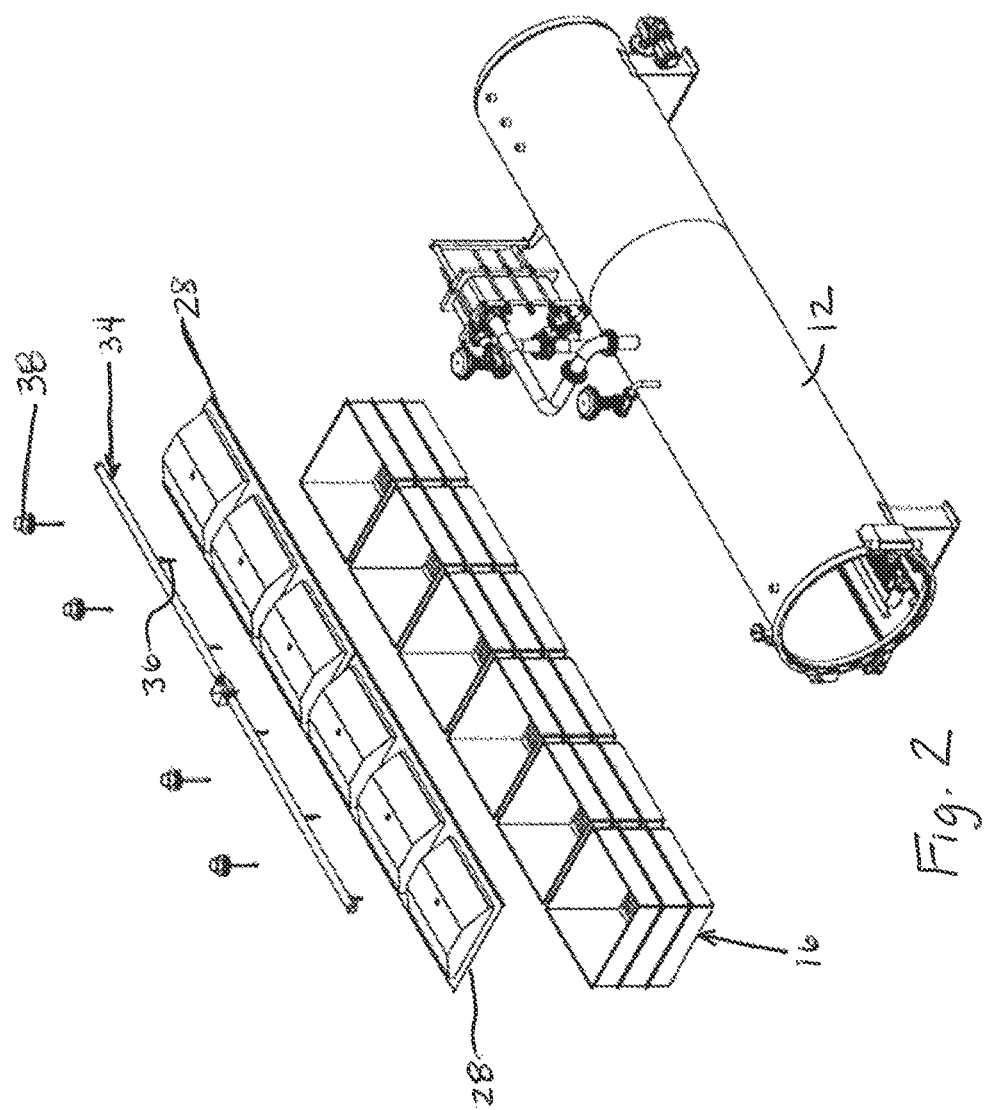
FIG. 2 is an exploded perspective view of a first embodiment of the new retort.
Figure 21:
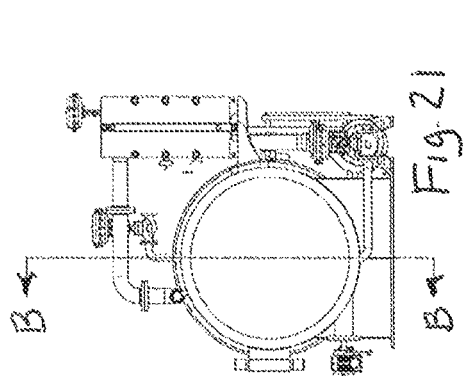
FIG. 21 is an end view of the retort of 19.

FIG. 2 is an exploded view of a first embodiment of a retort system. A hinged door at one end of the retort is not shown, thus partially exposing the interior of the vessel body 12. Removed from the main retort vessel body 12 are six baskets 16, two distribution plenums 28 (each having three hoods that align with the six baskets below), a fluid distribution header 34, and flexible hoses 36 to provide a fluid connection between the stationary distribution header 34 and the actuating distribution plenum 28. However, it is recognized that the number of baskets, plenums and/or baskets per plenum could vary. Also provided is plenum actuation system 39, here formed in part by multiple plenum actuators 38, which may be pneumatic or hydraulic cylinders for moving the distribution plenum up and down within the interior of the retort vessel 12 between a first position above the baskets and a second position in which the plenum contacts the tops of the baskets to form a seal.

FIG. 3 is a side view of the retort according to the first embodiment shown in FIG. 2. An end opening 40 in the vessel is openable and closeable via a pivoting door 40a at one end of the retort vessel can be opened and closed for loading baskets into the interior of the vessel.

FIG. 4 is a cross-sectional end view taken along line A-A in FIG. 3. Visible within the interior of the vessel 12 is a basket 16 with the distribution plenum 28 lowered onto the top of basket to form a seal.

FIG. 5 is cross-sectional side view taken along line B-B of FIG. 4. As shown more clearly in FIG. 6, which corresponds to region 6 in FIG. 5, the plenum actuators 38 extend through the top outer wall of the retort vessel 12 and connect to the plenum 28 below via an extension rod 38a. In FIGS. 4 and 5, the distribution plenums 28 are shown lowered on to the baskets 16. When stroked up, the actuators 38 lift the plenums (e.g., between ½ inch and 2 inches or more) so that the baskets 16 can be moved into and out of the vessel 12 through the opening 40.

Referring now to FIGS. 7-12, one embodiment of a fluid distribution plenum 28 is shown comprising a plenum plate 42 and three hoods 44. The number of hoods per plenum could vary. The plenum plate 42 includes a plurality of openings 46 through the plate to distribute heat transfer liquid passing through the plate into the baskets 16 below. Each hood 44 includes one or more inlets 48 that is/are connected to the distribution header 34 by a flexible fluid connector 36 such as a hose. In the pictured embodiment, each hood 44 is aligned with and covers a plurality of openings 46 in the plenum plate 42. Heat transfer liquid enters through the inlet 48, passes through the hood 44 onto the plate 42, and then is distributed into the baskets 16 as it passes through the openings 46. Of course, other configurations of distribution plenums could be implemented. The present invention is broad enough to encompass other plenum configurations and is not limited to embodiment disclosed in FIGS. 7-12.

FIGS. 13-17 show one embodiment of a product basket 16 for use with the invention. With particular reference to FIG. 13, the basket comprises an open top, a sealing surface 49 surrounding the open top, solid side walls 50 without any openings, thus preventing liquid flow through the side walls, and a false bottom comprising a removable bottom plate 52. As seen in FIGS. 13 and 14, the side walls 50 are supported by strengthening ribs 54 around the perimeter of the basket 16 since the contents of the basket may be put under positive pressure during the retorting process. As best seen in FIG. 15, which is a bottom view of the basket 16, the removable bottom plate 52 is supported by two tracks or cross rails 56 at the bottom of the basket. These tracks may also be configured to allow the basket 16 to slide or roll on rails in the retort vessel 12, as is well known, to permit easier loading of the baskets into the retort.

Referring now to FIG. 16, which is a top view of the basket, and FIG. 17, which is a cross-section of the basket along line C-C in FIG. 16, the removable bottom plate 52 according to this embodiment is a two-layer structure in which the layers are separated by approximately ½ inch. In FIG. 16, a portion of the top layer has been cut away to reveal the bottom layer below. The top layer 58 is a plate with openings therethrough. The bottom layer 60 is a sieve with smaller openings through it than the through the top layer. The top layer is configured to provide strength to support products such canned food items. The bottom layer, having smaller openings than the top layer, regulates liquid flow through the bottom of the basket.

The flow characteristics of the removable bottom plate 52, and in particular the flow-regulating bottom layer 60, may be selected in conjunction with the circulation pump 24 to ensure that the baskets will fill with heat transfer liquid during the retort process to completely immerse packaged products within the baskets under pressure. The bottom plate 52 is removable so that a plate with appropriate flow characteristics can be selected depending on the products being treated within the basket. For example, if a basket 16 is loaded with canned food items, which can be packed tightly leaving very little free volume within the basket, a bottom plate that allows slightly more liquid flow through the basket may be desired because the small free volume will fill quickly but good circulation of new process liquid through the basket is needed to ensure good heat transfer. By contrast, if a basket is packed with food pouches that leave more free space within the basket, then a bottom plate that allows less liquid flow may be desirable to ensure that the basket completely fills with heat transfer liquid more quickly to reduce the come up time. Embodiments in which the bottom plate 52 is not removable are also possible.

According to other embodiments, the basket 16 may have one or more upper openings that together define a first flow area through which the basket receives processing liquid, and the sealing surface may surround each or all of the one or more upper openings. The basket 16 may also have one or more lower openings that together define a second flow area through which processing liquid drains from the basket. The second flow area defined by the one or more lower openings is less than the first flow area defined by the one or more upper openings, thus allowing processing liquid to be added to the basket more quickly than it can drain from the basket. The sealing surface 49 forms a seal around the one or more upper openings in the basket when the distribution plenum and the basket are pressed together so that flow out of the basket is limited by the one or more lower openings, which may be the flow control orifices described with respect to FIGS. 13-17.

According to another aspect, the circulation pump 24 may be a variable frequency drive pump, and one or more of the baskets may be monitored by a pressure gage (e.g., 15a with the hood or 15b at the bottom side of the plenum plate or 15c somewhere else along the pressure side of the pump). The pressure gage may further be operatively coupled to the pump or a pump controller to provide a feedback signal. In this manner, liquid flow provided by the pump to the baskets can be adjusted to fill the baskets more quickly and/or maintain a desired pressure within the baskets during the retorting process. By way of example, a retort vessel may typically be controlled to ramp up pressure in the vessel by adding air overpressure (e.g., 1-35 psi) during heating and then ramp the air overpessure back down during cooling. In addition, the internal basket pressure could be maintained at some pressure level above the air overpressue level (e.g., 1-5 psi over the vessel air overpressure).

Importantly, although the baskets are described as having solid side walls and flow control orifices in the bottoms of the baskets, other equally acceptable embodiments are contemplated in which the side walls of the baskets may also contain openings or flow control orifices, especially near or adjacent to the bottom. Similarly, the flow control orifices could be placed at the bottom of the side walls, rather than the in the bottom of the basket, and still allow the basket to drain as desired without departing from the spirit and scope of the invention. Also, rather than a sieve plate containing multiple flow control orifices, a single flow control orifice could be used that is either completely passive, adjustable, or actively controllable to change the flow characteristics through the basket.

Referring now to FIGS. 18-22, a second embodiment of the new closed column retort system is shown that differs from the first embodiment of FIGS. 2-6 primarily in that the distribution plenum remains stationary while the baskets are actuated up or down to seal against the bottom of the distribution plenum.

Figure 20:
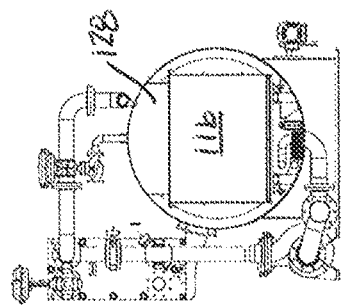
FIG. 20 is a cross-section view taken along line A-A of FIG. 19.
Figure 19:
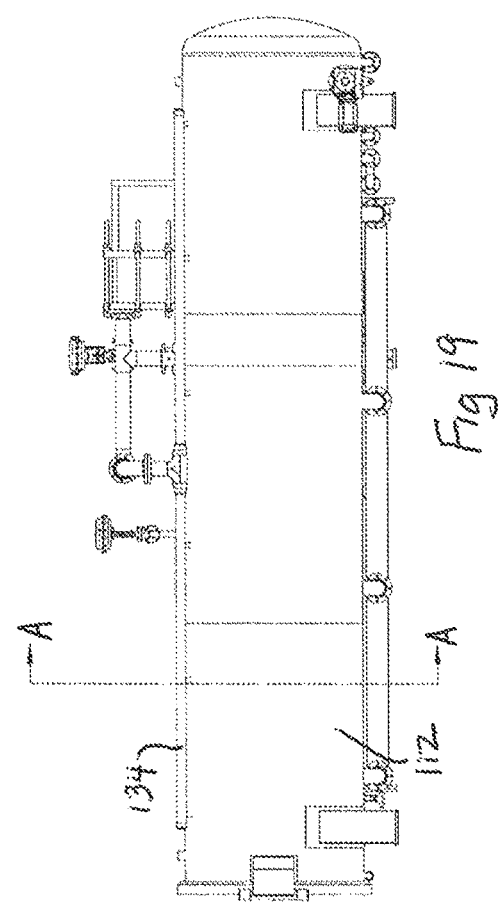
FIG. 19 is a side view of the retort of FIG. 18.
Figure 22:
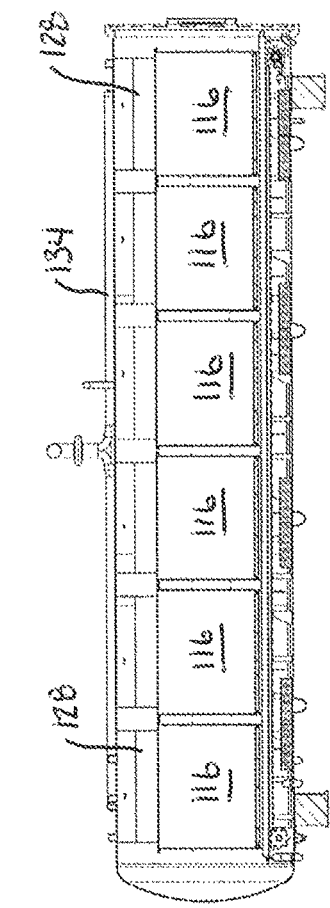
FIG. 22 is a cross-section taken along ling B-B of FIG. 21.

FIG. 18 shows an exploded view of a closed column retort 100 in which an exemplary array of six baskets 116, two fluid distribution plenums 128, and a pair of basket lift rails 162 have been removed from the main retort vessel 112. A fluid distribution header 134 according to this embodiment is located outside of the retort vessel 112. Each of the fluid distribution plenums 128 have three distribution zones comprising a plurality of openings surrounded by a perimeter wall. As best seen in FIGS. 20 and 22, the distribution plenums 128 according to this embodiment are secured in a fixed position in the vessel 112 such that the perimeter wall around each distribution zone forms a seal against the top inside wall of the vessel. Of course, similar to the first embodiment, any number of baskets and/or corresponding distribution plenums are contemplated and within the scope of the invention.

According to this embodiment, the baskets 116 are inserted into the retort vessel 112 on a pair a basket lift rails 162. When the rails are actuated to stroke up, the baskets 116 are pressed up against the bottom of the distribution plenum 128, as shown in FIGS. 20 and 22, to form a seal. Various mechanisms for linearly lifting and lowering rails and/or a plurality of containers are possible, including for example the lift mechanisms disclosed in U.S. Pat. No. 7,712,202, which is incorporated herein by reference.

With respect to both the first embodiment shown in FIGS. 2-6, and the second embodiment shown in FIGS. 18-22, the distribution plenum and baskets are configured to form at least a modest seal around the tops of the baskets when either the plenum is lowered onto the baskets or the baskets are raised up to the plenum. According to some embodiments described herein, this is accomplished by a sealing surface on each basket that surrounds the upper openings in the basket, which may be a single upper opening. A seal is desired so that a positive pressure can be built up in the baskets to preserve the integrity of the heated product packages. As would be easily understood by a person of skill in the art, the desired seal could be accomplished by a wide variety of means including, but not limited to, a flexible member on the lower surface of the distribution plenum that deforms when pressed against the top of a basket, a gasket around the upper rim of the basket, or even simply metal to metal contact between the basket and distribution plenum when pressed together.

Having described the invention in detail and by reference to the various embodiments, it should be understood that modifications and variations thereof are possible without departing from the scope of the claims of the present application.

Certain aspects of the application include the following:

X1. A retort system, comprising: a vessel defining an interior volume; one or more removable baskets for holding one or more products to be treated, the one or more removable baskets configured to be received within the interior volume of the vessel; a heat exchange liquid circulation loop having a discharge side, a suction side, and a pump operable to transport heat exchange liquid from the suction side to the discharge side; a distribution plenum for supplying heat exchange liquid into each of the one or more removable baskets, the distribution plenum in fluid connection with the discharge side of the heat exchange liquid circulation loop; and an actuation system operable to move the distribution plenum between a first position above the one or more removable baskets in the interior volume of the vessel and a second position in which the distribution plenum contacts each of the one or more removable baskets; wherein each of the one or more removable baskets comprises at least one flow control orifice that is proximate the bottom of the basket and configured to slow drainage of heat exchange liquid out of the basket.

X2. The retort system of X1, further comprising: a sump below the one or more removable baskets proximate the bottom of the vessel, the sump being configured to collect heat exchange liquid that drains from the one or more baskets and being in fluid communication with the suction side of the heat exchange liquid circulation loop.

X3. The retort system of X1, wherein the heat exchange liquid circulation loop further includes a heat exchanger located between the suction side and the discharge side for heating heat exchange liquid.

X4. The retort system of X1, wherein the basket comprises an open top, solid sidewalls without openings, and a removable bottom containing a plurality of flow control orifices.

X5. The retort system of X4, wherein the distribution plenum and basket together form a seal around the open top of the basket when the distribution plenum is in the second position.

X6. The retort system of X1, wherein the distribution plenum is fluidly connected to the discharge side of the heat exchange liquid circulation loop by a flexible hose.

X7. A retort system comprising: a vessel defining an interior volume; a plurality of removable baskets for holding packaged products, each of the baskets configured to be received within the interior volume of the vessel and comprising one or more upper openings that together define a first flow area for receiving heat exchange liquid, a sealing surface that surrounds the one or more upper openings, and one or more lower openings that together define a second flow area for limiting the drainage of heat exchange liquid from the basket; a heat exchange liquid circulation loop having a discharge side, a suction side, and a pump operable to transport heat exchange liquid from the suction side to the discharge side; a distribution plenum configured to evenly distribute heat exchange liquid into each of the plurality of baskets, the distribution plenum in fluid connection with the discharge side of the heat exchange liquid circulation loop; and an actuation system operable to press together the distribution plenum and the sealing surface of each of the plurality of baskets to form a seal around the one or more upper openings in each basket; wherein the second flow area defined by the one or more lower openings in each basket is smaller than the first flow area defined by the one or more upper openings in each basket.

X8. The retort system of X7, wherein the distribution plenum is movable between a first position above the plurality of baskets and a second position in which the distribution plenum is in contact with the sealing surfaces of each basket.

X9. The retort system of X7, wherein the actuation system is operable to lift the plurality of baskets from a first position below the distribution plenum to a second position in which the sealing surface of each basket is pressed against the distribution plenum to form a seal.

X10. The retort system of X7, wherein the one or more lower openings in the basket are formed by a first sieve plate.

X11. The retort system of X10, wherein the first sieve plate is removable from the basket and replaceable by a second sieve plate having different flow characteristics than the first sieve plate.

X12. A retort system comprising: a plurality of baskets for holding packaged products to be treated, each basket having a liquid inlet and one or more liquid outlets; a retort vessel sized to receive the plurality of baskets within the vessel; a process liquid circulation loop comprising a suction side proximate the bottom of the vessel, a discharge side proximate the top of the vessel, and a circulation pump located between the suction side and the discharge side, the pump being operable to transport process liquid from the suction side to the discharge side; a discharge plenum fluidly connected or connectable to the discharge side of the circulation loop and configured to evenly distribute process liquid into the plurality of baskets; a sump in the bottom of the vessel below the one or more liquid outlets of the plurality of baskets, the sump fluidly connected or connectable to the suction side of the process liquid circulation loop; and an actuation system operable to press together the distribution plenum and the plurality of baskets to form a respective seal around the liquid inlet of each basket and thus form a plurality of closed column process liquid paths from discharge side of the circulation loop, through the distribution plenum, and through each respective basket to the one or more liquid outlets of each respective basket.

X13. The retort system of X12, wherein the one or more liquid outlets of each respective basket are configured to restrict the drainage of process liquid out of the basket such that the basket will fill with process liquid when the plenum is sealed against the basket and process liquid is supplied to the basket by the plenum through the inlet opening of the basket.

X14. The retort system of X13, wherein the actuation system lifts the plurality of baskets into engagement with the distribution plenum.

X15. The retort system of X13, wherein the actuation system lowers the distribution plenum into engagement with the plurality of baskets.

Figure 24B:
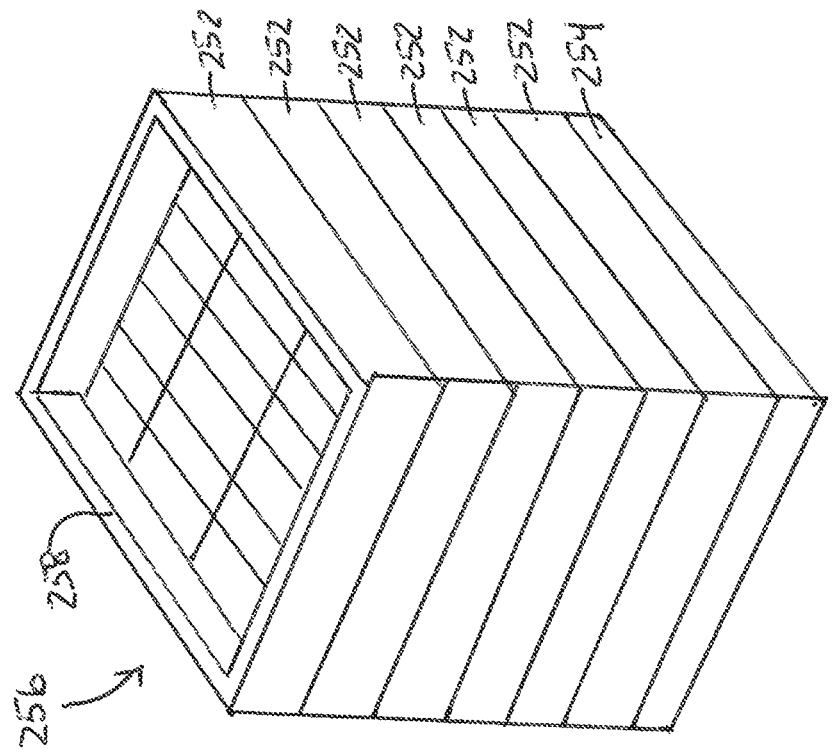
FIGS. 24A and 24B depict a stacked tray assembly as an alternative to a retort basket.
Figure 24A:
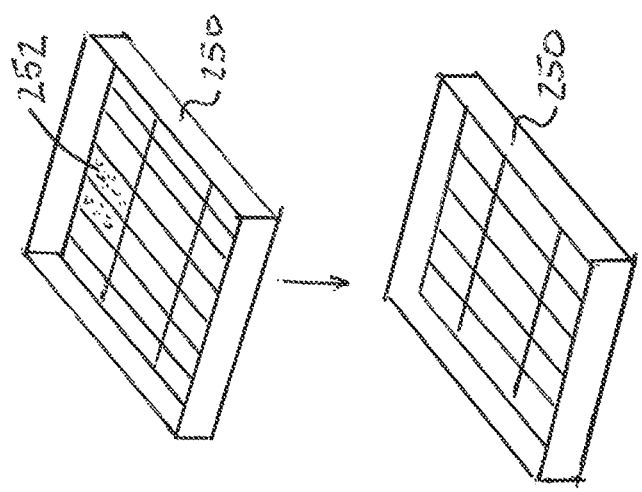

Although the above-described embodiments primarily focus on systems that include traditional retort baskets to hold the containerized products to be treated, it is recognized that the system could be implemented with other structures that form a product holding structure capable of filling with water when the circulation pump is operating. For example, packaged or "in-container" products in containers, such as cans, jars, boxes or flexible pouches, could be loaded into trays 250, and the trays 250 stacked atop one another, per FIGS. 24A and 24B. Each tray may be open at the top and have a structurally supported bottom 252 that is perforated, screen-type or grid-type to provide flow openings. In such an arrangement, a pallet type structure 254 may be placed at the bottom of the stacked trays to support the stacked trays and/or define the flow restricting openings that cause the stacked tray assembly to fill. The stacked trays 250 (with or without supporting pallet), which have solid side walls, then form a product holding structure 256 through which the water can be passed in a manner similar to that described above. At least the top tray in the structure may include a flange structure 258 suitable for sealing with the plenum(s) as described above. As used herein, the term "product holding structure" is used to encompass both baskets and stacked tray assemblies, as well as other structures, that provide the ability to fill with water and submerge the products therein even though the interior volume of the retort vessel itself does not fill to the same level.

Although the above description focuses primarily on commercial sterilization of packaged or containerized products (e.g., products in cans, jars, boxes or flexible pouches), the system could be implemented for other heat treating processes, such as pasteurization or cooking. As used herein, the term "heat treating" is broadly used to refer to all such processes in which heat is transferred to the product in the container.

Figure 23:
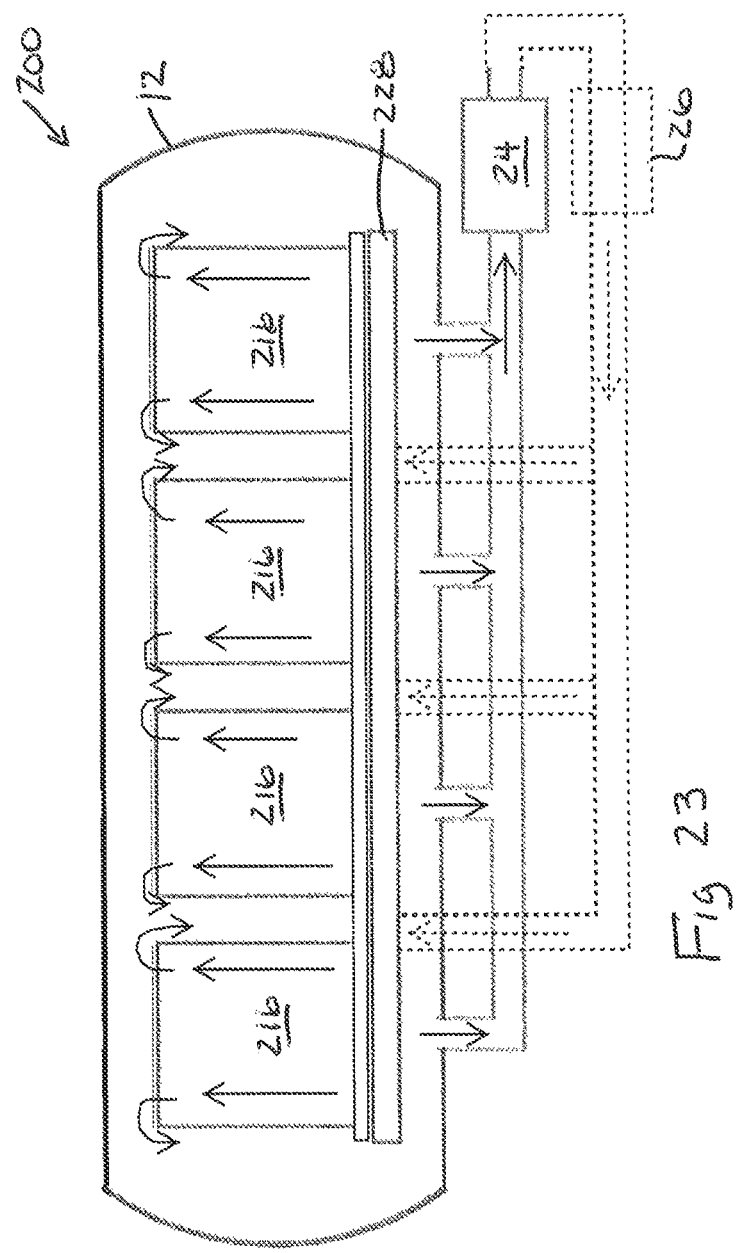
FIG. 23 is a schematic depiction of an alternative system embodiment in which columnar liquid flow through the food product baskets is upward.

Although the above-described embodiments contemplate a downward flow of heated liquid through each product holding structure, it is recognized that embodiments with an alternative flow direction are possible. For example, a system 200 with an upward flow through the product holding structures could be implemented, per the schematic depiction of FIG. 23. In such a system 200, the heated liquid is fed via pump 24 through heat exchanger 26 to a distribution feed system 228 (e.g., plenums or other) to the bottom of the product holding structures 216 (e.g., a bottom seal is made) and the liquid flows upward through the structures and overflows from the top to fall back down into the vessel sump for recirculation. Flow restriction orifices may not be required in such an embodiment, although inclusion of one or more orifices would permit the columnar flow through the product holding structures to be achieved under higher pressure. In this retort system 200, the distribution feed system 228 may be movable up and down for engaging the product holding structures 216, or the product holding structures may be movable up and down for engaging the distribution feed system. Any suitable actuation system could be used for these purposes.

Notably, in each embodiment, the water level in the baskets or other product holding structures will reach a submersion level (e.g., completely full or at least level 230 in FIG. 1) that is above the products contained therein, while the water level in the rest of the vessel volume will remain at a lower level (e.g., preferably a level 232 below the baskets or other product holding structures, although a level 234 is also possible, but less desirably requires a higher volume of water).

As used herein the term "fluidly connectable" encompasses actual connections that enable fluid flow as well as arrangements that selectively enable fluid flow (e.g., by opening of a valve or by providing two parts of a flow path that are movable into connection with each other on a selective basis).

What is claimed is:

1. A retort system, comprising:
   a vessel defining an interior volume, the vessel including at least one door movable between open and closed positions;
   a plurality of product holding structures for holding one or more products to be treated, the product holding structures configured to be received within the interior volume of the vessel;
   a heat exchange system, including a liquid circulation path having a discharge side, a suction side and a pump operable to move a heat exchange liquid from the suction side to the discharge side, wherein the discharge side includes at least one distribution plenum located in an upper region of the interior volume above the plurality of product holding structures, a bottom of the at least one distribution plenum including a plurality of openings for outfeed of heat exchange liquid, wherein the suction side is fluidly connected to a lower region of the interior volume;
   an actuation system located below the product holding structures and configured to move the plurality of product holding structures upward into an operating position in engagement with the bottom of the at least one distribution plenum such that a top of each product holding structure seals against the bottom of the at least one distribution plenum;
   a pressure sensor located in the liquid circulation path upstream of the plurality of holding structures and downstream of the pump;
   a pump controller for controlling the pump;
   wherein each product holding structure includes:
      one or more upper inlet openings that together define a first flow area for receiving heat exchange liquid from the at least one distribution plenum, and
      a plurality of lower outlet openings that together define a second flow area for outflow of heat exchange liquid, the second flow area being smaller than the first flow area for limiting flow of heat exchange liquid out of the product holding structure so as to enable the product holding structures to fill and pressurize during operation of the pump;
   wherein the pump controller is configured to operate the pump, based at least in part upon an output of the pressure sensor, such that:
      the heat exchange liquid moves from the at least one distribution plenum down into and through the product holding structures causing the product holding structures to fill with heat exchange liquid to a product submersion level while the heat exchange liquid flows through the product holding structures and a level of heat exchange liquid outside the product holding structures and within the interior volume remains below the product submersion level; and a hydraulic pressure within each product holding structure and within the at least one distribution plenum is controlled via pump operation to be maintained in a range between 1-5 psi higher than an overpressure within the interior volume of the vessel and outside the at least one distribution plenum and the product holding structures.

2. The retort system of claim 1, wherein pump controller is configured to operate the pump such that the product holding structures fill with heat exchange liquid to the product submersion level while the level of heat exchange liquid outside the product holding structures and within the interior volume remains below the product holding structures.

3. The retort system of claim 1, further comprising:
a sump forming the lower region of the interior volume, the sump below the product holding structures and being configured to collect heat exchange liquid that exits from the product holding structures.

4. The retort system of claim 1, wherein the liquid circulation path further includes a heat exchanger located between the suction side and the discharge side for heating the heat exchange liquid.

5. The retort system of claim 1, wherein each product holding structure comprises an open top, solid sidewalls without openings, and a bottom containing the the plurality of lower outlet openings.

6. The retort system of claim 5, wherein each product holding structure comprises one of a retort basket or a stacked tray assembly.

7. A retort system, comprising:
a retort vessel defining an interior volume;
a plurality of product holding structures received within the interior volume, each product holding structure defining an interior space containing multiple containerized products, each product holding structure comprising:
one or more upper inlet openings that together define a first flow area for receiving heat exchange liquid into the interior space and a plurality of lower outlet openings that together define a second flow area for outflow of heat exchange liquid from the interior space, the second flow area being smaller than the first flow area for limiting flow of heat exchange liquid out of the interior space;
a heat exchange liquid flow system that defines a heat exchange liquid circulation path with a pump, a distribution feed system at a downstream side of the pump and located above and engaged with a top of each product holding structure to direct heat exchange liquid down into each product holding structure, and a suction side upstream of the pump and connected to a sump region of the interior volume for intake of heat exchange liquid;
a pressure sensor located in the liquid circulation path upstream of the plurality of holding structures and downstream of the pump;
a pump controller for controlling the pump;
wherein the pump controller is configured to operate the pump, based at least in part upon an output of the pressure sensor, such that:
the pump moves heat exchange liquid through the distribution feed system down into each product holding structure causing each product holding structure to fill with heat exchange liquid to a submersion level that submerges the containerized products within the interior space, while heat exchange liquid exits the plurality of outlet openings of each product holding structure and into the sump region and is delivered back to the pump in a manner such that a level of heat exchange liquid outside the product holding structure and within the interior volume of the retort vessel remains below the submersion level; and
a hydraulic pressure within each product holding structure is controlled via pump operation to be maintained higher than an overpressure within the interior volume of the vessel and outside the distribution feed system and the product holding structures.

8. The retort system of claim 7,
wherein the distribution feed system comprises a distribution plenum located in an upper region of the interior volume above the product holding structure, a bottom of the at least one distribution plenum including one or more openings for outfeed of heat exchange liquid, the bottom of the at least one distribution plenum engaged with the top of each product holding structure.

9. The retort system of claim 7, the product holding structures are configured such that a separate vertically downward closed column flow path is provided in each of the product holding structures, resulting in a plurality of vertically downward closed column flows.

10. A retort system, comprising:
a retort vessel defining an interior volume;
a product holding structure received within the interior volume, the product holding structure defining an interior space containing multiple containerized products, product holding structure comprising:
one or more upper inlet openings that together define a first flow area for receiving heat exchange liquid into the interior space and a plurality of lower outlet openings that together define a second flow area for outflow of heat exchange liquid from the interior space, the second flow area being smaller than the first flow area for limiting flow of heat exchange liquid out of the interior space;
a heat exchange liquid flow system that defines a heat exchange liquid circulation path with a pump, a distribution feed system at a downstream side of the pump and including at least one distribution plenum located above and engaged with a top of the product holding structure to direct heat exchange liquid down into the product holding structure, and a suction side upstream of the pump and connected to a sump region of the interior volume for intake of heat exchange liquid;
a pressure sensor located in the liquid circulation path upstream of the plurality of holding structure and downstream of the pump;
a pump controller for controlling the pump;
wherein the pump controller is configured to operate the pump, based at least in part upon an output of the pressure sensor, such that:
the pump moves heat exchange liquid through the distribution feed system down into the product holding structure causing the product holding structure to fill with heat exchange liquid to a submersion level that submerges the containerized products within the interior space, while heat exchange liquid exits the plurality of outlet openings of the product holding structure and into the sump region and is delivered back to the pump in a manner such that a level of heat exchange liquid outside the product holding structure and within the interior volume of the retort vessel remains below the submersion level; and a hydraulic pressure within the product holding structure is controlled via pump operation to be maintained in a pressure range higher than an overpressure within the interior volume of the vessel and outside the at least one distribution plenum and the product holding structure.

\* \* \* \* \*